United States Patent
Ma et al.

(10) Patent No.: US 12,506,995 B2
(45) Date of Patent: Dec. 23, 2025

(54) WIRELESS EARPHONE CONTROL METHOD AND APPARATUS, ELECTRONIC DEVICE AND WIRELESS EARPHONE

(71) Applicant: GOERTEK INC., Shandong (CN)

(72) Inventors: Binyi Ma, Shandong (CN); Chao Zhang, Shandong (CN); Xiaolong Jiang, Shandong (CN)

(73) Assignee: GOERTEK INC., Shandong (CN)

( * ) Notice: Subject to any disclaimer, the term of this patent is extended or adjusted under 35 U.S.C. 154(b) by 225 days.

(21) Appl. No.: 18/263,067

(22) PCT Filed: Sep. 28, 2021

(86) PCT No.: PCT/CN2021/121235
§ 371 (c)(1),
(2) Date: Jul. 26, 2023

(87) PCT Pub. No.: WO2022/170770
PCT Pub. Date: Aug. 18, 2022

(65) Prior Publication Data
US 2024/0098399 A1    Mar. 21, 2024

(30) Foreign Application Priority Data
Feb. 10, 2021  (CN) .......................... 202110182473.8

(51) Int. Cl.
*H04R 3/00*    (2006.01)
*G06T 7/60*    (2017.01)
(Continued)

(52) U.S. Cl.
CPC ............. *H04R 1/1041* (2013.01); *G06T 7/60* (2013.01); *G06T 7/73* (2017.01); *G06V 10/764* (2022.01);
(Continued)

(58) Field of Classification Search
CPC .......... H04R 1/1041; G06T 7/73; G06T 7/60; G06V 20/50; G06V 10/764
See application file for complete search history.

(56) References Cited

U.S. PATENT DOCUMENTS

| 9,101,279 B2 * | 8/2015 | Ritchey .................... G06F 3/147 |
| 2014/0343900 A1 * | 11/2014 | Goldstein ............... G06F 30/00 |
| | | 703/1 |

(Continued)

FOREIGN PATENT DOCUMENTS

| CN | 102662460 A | 9/2012 |
| CN | 103616950 A | 3/2014 |

(Continued)

*Primary Examiner* — Simon King
(74) *Attorney, Agent, or Firm* — Ingrassia Fisher & Lorenz, LLP (57) ABSTRACT

A wireless earphone control method is disclosed, which includes, but is not limited to: acquiring a control image; detecting grayscale value distribution in the control image to obtain a detection result of occlusion; and performing a corresponding wireless earphone control operation based on the detection result of occlusion. The step of detecting grayscale value distribution in the control image to obtain the detection result of occlusion includes, but is not limited to: calculating first mean grayscale values of multiple preset sample regions in the control image; determining an occlusion position in the control image based on size relationships among the first mean grayscale values; and determining the detection result of occlusion based on the occlusion position.

14 Claims, 3 Drawing Sheets

(51) Int. Cl.
      *G06T 7/73*         (2017.01)
      *G06V 10/764*    (2022.01)
      *G06V 20/50*      (2022.01)
      *H04R 1/10*       (2006.01)

(52) U.S. Cl.
      CPC .......... *G06V 20/50* (2022.01); *H04R 2420/07* (2013.01)

(56) References Cited

U.S. PATENT DOCUMENTS

| | | | |
|---|---|---|---|
| 2016/0171333 A1 | 6/2016 | Bui et al. | |
| 2019/0110120 A1* | 4/2019 | Sapozhnykov | H04R 1/1016 |
| 2019/0278556 A1 | 9/2019 | Usher et al. | |
| 2022/0021985 A1* | 1/2022 | Wexler | G10L 25/51 |
| 2022/0070596 A1* | 3/2022 | Dahl | H04R 25/658 |

FOREIGN PATENT DOCUMENTS

| | | | |
|---|---|---|---|
| CN | 104866081 A | 8/2015 | |
| CN | 105867818 A | 8/2016 | |
| CN | 106339298 A | 1/2017 | |
| CN | 107708007 A | 2/2018 | |
| CN | 109104658 A | 12/2018 | |
| CN | 109862274 A | 6/2019 | |
| CN | 110401892 A | 11/2019 | |
| CN | 112347902 A | 2/2021 | |
| CN | 112929778 A | 6/2021 | |
| JP | 2013145434 A | 7/2013 | |
| KR | 20040058271 A | 7/2004 | |
| WO | 2017206383 A1 | 12/2017 | |

* cited by examiner

WIRELESS EARPHONE CONTROL METHOD AND APPARATUS, ELECTRONIC DEVICE AND WIRELESS EARPHONE

CROSS-REFERENCE TO RELATED APPLICATIONS

This application is a U.S. National-Stage entry under 35 U.S.C. § 371 based on International Application No. PCT/CN2021/121235, filed Sep. 28, 2021 which was published under PCT Article 21(2) and which claims priority to Chinese Application No. 202110182473.8, filed Feb. 10, 2021, which are all hereby incorporated herein in their entirety by reference.

TECHNICAL FIELD

This application pertains to the field of wireless earphones, in particular to a wireless earphone control method and apparatus, an electronic device, a wireless earphone, and a computer-readable storage medium.

BACKGROUND

With the development of Bluetooth chip technology, the technology of wireless earphones has been increasingly mature, and more and more users have chosen wireless earphones as their daily audio devices. The existing wireless earphones not only have the advantage of being wireless, but also have high-quality audio effects and rich control functions, which can meet users' needs for sound quality and also meet their usage needs.

Currently, wireless earphone control methods include touch control, press control, and tap control. These control methods require precise control by users on the wireless earphones. However, they have high operational requirements for users, which may result in insensitive control and bring inconvenience to the normal use of users. In addition, other objects, desirable features and characteristics will become apparent from the subsequent summary and detailed description, and the appended claims, taken in conjunction with the accompanying drawings and this background.

SUMMARY

The object of the present disclosure is to provide a wireless earphone control method and apparatus, an electronic device, a wireless earphone, and a computer-readable storage medium, in which, by collecting a control image and controlling the wireless earphone based on the grayscale value distribution in the control image, users do not need to touch or press the body of the wireless earphone, thereby providing convenience for users to use the wireless earphone.

To solve the above technical problem, the present disclosure provides a wireless earphone control method, which comprises the steps of:
acquiring a control image;
detecting grayscale value distribution in the control image to obtain a detection result of occlusion; and
performing a corresponding wireless earphone control operation based on the detection result of occlusion.

Optionally, the step of detecting grayscale value distribution in the control image to obtain the detection result of occlusion comprises:
calculating first mean grayscale values of multiple preset sample regions in the control image;
determining an occlusion position in the control image based on size relationships among the first mean grayscale values; and
determining the detection result of occlusion based on the occlusion position.

Optionally, after acquiring the control image and before detecting the grayscale value distribution in the control image, the method further comprises:
calculating a second mean grayscale value of the control image;
determining whether the second mean grayscale value is less than a first threshold; and
if so, performing the step of detecting the grayscale value distribution in the control image.

Optionally, before acquiring the control image, the method further comprises:
when an earphone wearing event is detected, acquiring a first preset quantity of the control images as reference images; and
calculating a third mean grayscale value of the reference images, and setting the third mean grayscale value to be the first threshold.

Optionally, the step of perform the corresponding wireless earphone control operation based on the detection result of occlusion comprises:
adding the detection result of occlusion to a detection result list;
detecting a combination type of detection result of occlusion in the detection result list by using multiple occlusion types in a preset occlusion determination rule; and
when the combination type meets requirements of the occlusion type, performing a corresponding wireless earphone control operation based on the occlusion type corresponding to the combination type.

Optionally, before adding the detection result of occlusion to the detection result list, the method further comprises:
judging whether a quantity of detection results of occlusion in the detection result list is less than a second preset quantity;
if so, performing the step of adding the detection result of occlusion to the detection result list; and
if not, clearing the detection result list and performing the step of adding the detection result of occlusion to the detection result list.

The present disclosure also provides a wireless earphone control apparatus, which comprises:
a control image acquisition module for acquiring a control image for controlling the wireless earphone;
an occlusion detection module for detecting grayscale value distribution in the control image to obtain a detection result of occlusion; and
a control operation performing module for performing a corresponding wireless earphone control operation based on the detection result of occlusion.

The present disclosure also provides an electronic device, which comprises:
a memory for storing a computer program; and
a processor for implementing the wireless earphone control method as described above when executing the computer program.

The present disclosure also provides a wireless earphone, which comprises: a camera for collecting a control image, and the electronic device as described above.

The present disclosure also provides a computer-readable storage medium having computer executable instructions stored thereon, when the computer executable instructions are loaded and executed by a processor, the wireless earphone control method as described above is implemented.

The present disclosure provides a wireless earphone control method, which comprises the steps of: acquiring the control image for controlling the wireless earphone; calculating the first mean grayscale value of the control image, and using the first mean grayscale value to detect the grayscale value distribution in the control image and obtain the detection result of occlusion; and performing the corresponding wireless earphone control operation based on the detection result of occlusion.

It can be seen that, in this method, the wireless earphone is controlled based on the collection of control images and the occlusion state in the control images. In the prior art, users need to touch or press the body of the wireless earphone, and such a control requires high accuracy, which may cause inconvenience to the normal use of users. However, in this method, users only need to block the image collection device on the wireless earphone and do not need to touch or press the body of the wireless earphone, thereby reducing the operational accuracy of controlling the wireless earphone. At the same time, in this method, the occlusion state in the control image is detected to obtain the detection result of occlusion, and the corresponding wireless earphone control function is performed based on this result, thereby achieving various wireless earphone control functions and providing convenience to the normal use of users. The present disclosure also provides a wireless earphone control apparatus, an electronic device, a wireless earphone, and a computer-readable storage medium, which have the beneficial effects as described above.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In order to make the objectives, technical solutions, and advantages of the present application clearer, the technical solutions of the present application will be described clearly and completely in conjunction with specific embodiments of the present application and corresponding drawings. Obviously, the described embodiments are only part of the embodiments of the present application, rather than all of the embodiments. Based on the embodiments in the present application, all other embodiments obtained by those of ordinary skill in the art without paying creative work shall fall within the protection scope of the present application.

Currently, the control methods for wireless earphones include touch control, press control, and tap control. These control methods require users to touch or press control on the body of the wireless earphone, which requires high control accuracy. Since the user cannot accurately determine the position of touch or press, these control methods may cause inconvenience to the normal use of users. In view of this, in the embodiments of the present disclosure, the control image may be collected by the image collection device on the wireless earphone, and the wireless earphone is controlled based on the grayscale value distribution in the control image; in order to realize the control on the wireless earphone, users only need to block the image collection device and do not need to touch or press the body of the wireless earphone, thereby reducing the control accuracy of the wireless earphone and improving the user experience.

Figure 1:
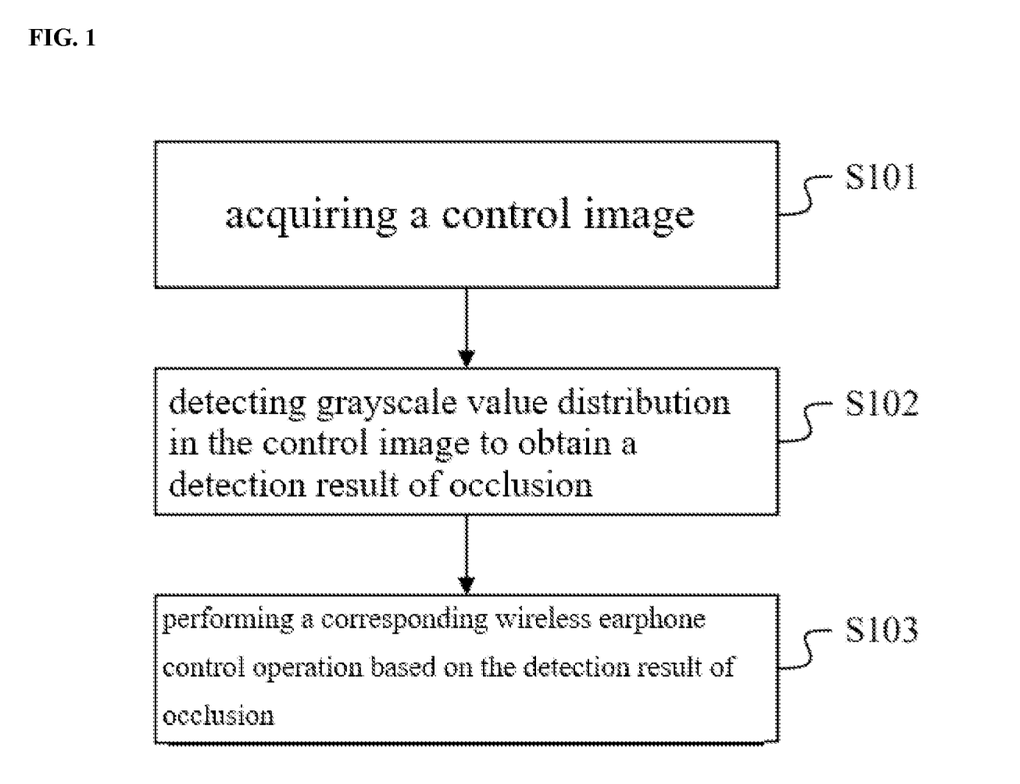
FIG. 1 is a flowchart of a wireless earphone control method according to an embodiment of the present disclosure.

Please refer to FIG. 1, which is a flowchart of a wireless earphone control method according to an embodiment of the present disclosure, the method may comprise:

S101. acquiring a control image;

In the embodiment of the present disclosure, an image collection device installed on the body of the wireless earphone is used to acquire the control image, and then the wireless earphone is controlled by detecting the grayscale value distribution in the control image.

It should be noted that, in the embodiments of the present disclosure, the type of wireless earphone is not limited. The wireless earphones may be ordinary wireless earphones in which the left and right earphones are connected by a wired connector or a strap, independent TWS (True Wireless Stereo) earphones in which the left and right earphone are independent, or other types of wireless earphones. In the embodiments of the present disclosure, the installation position of the image collection device, which is related to the type of wireless earphones, is also not limited, as long as it can be ensured that the image collection device is not blocked. For example, when the wireless earphones are TWS earphones, the image collection device may be installed on the left ear body of the wireless earphone, on the right ear body of the wireless earphone, or on both left and right bodies of the wireless earphone. When the wireless earphones are ordinary wireless earphones in which the left and right earphones are connected by a wired connector or a strap, the image collection device may be installed on the wired connector or on the strap. In the embodiments of the present disclosure, the quantity of image collection devices is also not limited. Any quantity of image collection devices can be provided on the wireless earphone, and users can decide according to their actual needs. In the embodiments of the present disclosure, the specific parameters of the image collection device are also not limited, as long as they can meet the requirements of grayscale value detection.

In the embodiments of the present disclosure, the timing of starting to acquire the control image is also not limited. For example, the acquisition of control image may start when the wireless earphone is turned on, or start when it is detected that the wireless earphone is being worn. Since the control instructions collected after the wireless earphone is worn are the correct control instructions, in the embodiment of the present disclosure, the acquisition of control image may start when it is detected that the wireless earphone is being worn. It should be noted that, in the embodiments of the present disclosure, the specific methods for detecting the wearing of wireless earphone are not limited, and users can refer to relevant technologies. In the embodiments of the present disclosure, it is also not limited whether, after it is detected that the wireless earphone is worn, it is necessary to wait for a preset period of time before acquiring the control image. When the wireless earphone wearing detection method can ensure that the wearing is not misjudged, there is no need to wait for a preset period of time. When the wireless earphone wearing detection method may misjudge and it needs to ensure that the wireless earphone is correctly worn, it may wait for a preset period of time. Considering that the wireless earphone detection method may be interfered and generate false results, in the embodiments of the present disclosure, it may wait for a preset period of time to ensure that the user correctly wears the wireless earphone before acquiring the control image. It should be noted that, in the embodiments of the present disclosure, the specific value of the preset period of time is not limited, and users can set them according to actual application needs. In the embodiments of the present disclosure, the control image acquisition method is also not limited. For example, they may be acquired at fixed time intervals or at random time intervals. Since fixed time intervals are easy to realize and calculate, in the embodiments of the present disclosure, control images may be acquired at fixed time intervals. Of course, in the embodiments of the present disclosure, the specific value of the fixed time interval is not limited, and users can set it according to actual application needs.

In the embodiments of the present disclosure, the specific parameters, such as resolution, aperture, sensitivity, etc., of the control image are also not limited, as long as the correct detection of the grayscale value distribution can be ensured.

S102. detecting grayscale value distribution in the control image to obtain a detection result of occlusion;

The embodiment of the present disclosure detects the grayscale values in the control image to achieve the control of wireless earphone. At the same time, considering that users may use various methods to block image collection devices to generate various occlusion images, the embodiment of the present disclosure detects the specific grayscale value distribution in the control image to determine the specific occlusion type, determines the detection result of occlusion based on this type, and finally uses the detection result of occlusion to achieve multiple control methods for the convenience of the normal use of users.

It should be noted that, in the embodiments of the present disclosure, the specific content of the detection result of occlusion is not limited. For example, the detection result of occlusion may include whether there is occlusion in the control image, i.e., it may include two types of detection result of occlusion: occluded and not occluded. The content of detection result of occlusion also includes the content reflecting the occlusion position in the control image, such as upper half occlusion, lower half occlusion, left half occlusion, right half occlusion, etc. When the size or proportion of occluded regions in the control image can be numerically reflected, the content of detection result of occlusion may also include the specific sizes or proportions of occluded regions.

It should be noted that, in the embodiments of the present disclosure, the detection method of the grayscale value distribution is not limited. For example, the grayscale value distribution may be detected by constructing a grayscale histogram, or by calculating the mean grayscale value of the sample region. Considering that calculating the mean grayscale value of the sample region is easy to realize and have good effects, in the embodiments of the present disclosure, the grayscale value distribution may be detected by calculating the mean grayscale value of the sample region.

In the embodiments of the present disclosure, the size and shape of the preset sample region are not limited, as long as the grayscale value distribution can be accurately reflected within this size and shape range. It can be understood that the preset sample region of specific sizes and shapes should be within the range of the control image. In the embodiments of the present disclosure, the quantity of preset sample regions is also not limited, which may be any numerical value, and users can set it according to actual application needs. In the embodiments of the present disclosure, the layout of preset sample regions is also not limited, which is related to the quantity of preset sample regions. For example, it can be arranged horizontally, vertically, like a chessboard, or in other ways.

Furthermore, in the embodiments of the present disclosure, the specific method of detecting the grayscale value distribution by calculating the mean grayscale value of the preset sample region is not limited. For example, it may be that, the mean grayscale value of the preset sample region is calculated and compared with a preset threshold to determine the grayscale value distribution; alternatively, the grayscale value distribution is determined by the size relationships among the mean grayscale values. Since the size relationships among the mean grayscale values can effectively reflect the grayscale value distribution and thus can accurately detect the occlusion position in the control image, in the embodiment of the present disclosure, the grayscale value distribution may be determined by using the size relationships among the mean grayscale values of the preset sample regions.

In a possible scenario, the step of detecting grayscale value distribution in the control image to obtain the detection result of occlusion may comprise:

step 11: calculating first mean grayscale values of multiple preset sample regions in the control image;

step 12: determining an occlusion position in the control image based on size relationships among the first mean grayscale values; and step 13: determining the detection result of occlusion based on the occlusion position.

It should be noted that, in the embodiments of the present disclosure, the specific method of using size relationships to determine the occlusion position in the control image is not limited. This method is related to the layout of the preset sample regions, and users can set the specific method according to the specific layout chosen.

Figure 2:
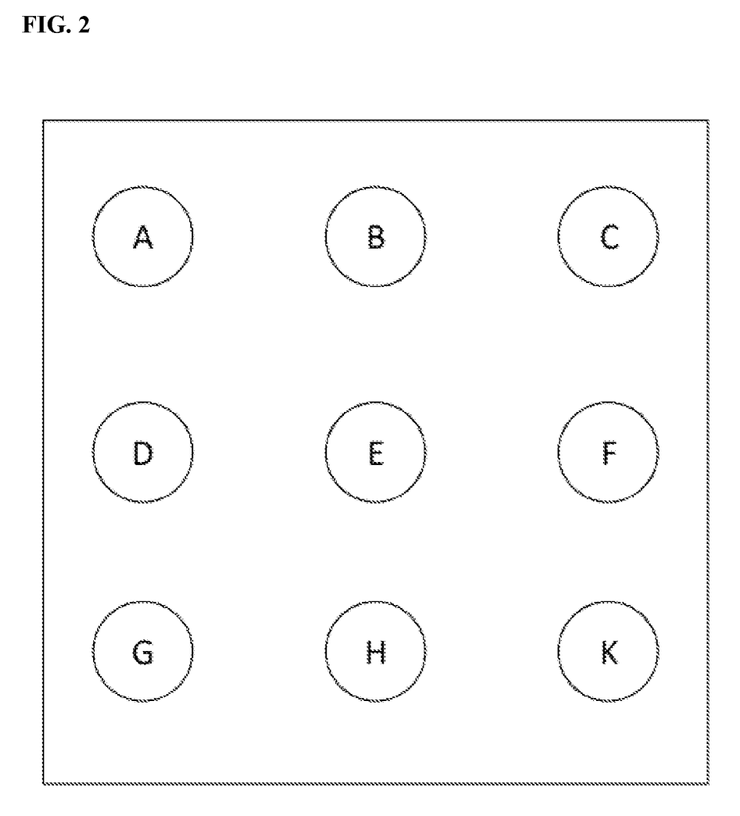
FIG. 2 is a schematic diagram of the layout of preset sample regions in a control image according to an embodiment of the present disclosure.

The process of using the size relationships among the first mean grayscale values to determine the occlusion position in the control image is explained below in conjunction with a specific example. Please refer to FIG. 2, which is a schematic diagram of the layout of preset sample regions in the control image according to an embodiment of the present disclosure. The circular regions marked with A, B, C, D, E, F, G, H and K are the preset sample regions. First, the grayscale values of the preset sample regions are calculated to obtain grayscale values A, B, C, D, E, F, G, H, and K. Then, the occlusion position in the control image is determined by using the following method:

1. if the grayscale value A is less than the grayscale value G, the grayscale value B is less than the grayscale value H, and the grayscale value C is less than the grayscale value K, it is determined that the occlusion position is the upper half of the image;

2. if the grayscale value A is greater than the grayscale value G, the grayscale value B is greater than the grayscale value H, and the grayscale value C is greater than the grayscale value K, it is determined that the occlusion position is the lower half of the image;
3. if the grayscale value A is less than the grayscale value C, the grayscale value D is less than the grayscale value F, and the grayscale value C is less than the grayscale value K, it is determined that the occlusion position is the left half of the image; and
4. if the grayscale value A is greater than the grayscale value C, the grayscale value D is greater than the grayscale value F, and the grayscale value C is greater than the grayscale value K, it is determined that the occlusion position is the right half of the image.

It should be noted that, in the embodiments of the present disclosure, the calculation method of the mean grayscale value is not limited, and users can refer to the relevant techniques for calculating the mean grayscale value. In the embodiments of the present disclosure, the specific form of the detection result of occlusion is also not limited.

S103. performing a corresponding wireless earphone control operation based on the detection result of occlusion.

It should be noted that, in the embodiments of the present disclosure, it is not limited which detection result of occlusion corresponds to which specific wireless earphone control operation, and users can choose and set it according to actual application needs.

In the embodiments of the present disclosure, it is not limited whether the corresponding wireless earphone control operation can be performed through the combination of detection result of occlusion. When a single detection result of occlusion can meet the application requirements, the wireless earphone control operation may be performed through the single detection result of occlusion. When it is necessary to extend the wireless earphone control operation, the corresponding wireless earphone control operation may also be performed through the combination of detection result of occlusion. In order to provide users with more diverse control options, in the embodiments of the present disclosure, the corresponding wireless earphone control operation may be performed through the combination of detection result of occlusion. It can be understood that, if the specific control operation needs to be determined through the combination, a preset combination type needs to be used to match the combination type of detection result of occlusion to determine the specific control operation. In the embodiments of the present disclosure, the specific pairing process is not limited, it is also not limited which combination type corresponds to which specific wireless earphone control operation, as long as the actual application needs can be met.

Based on the above embodiment, in this method, the wireless earphone is controlled based on the collection of control images and the occlusion state in the control images. In the prior art, users need to touch or press the body of the wireless earphone, and such a control requires high accuracy, which may cause inconvenience to the normal use of users. However, in this method, users only need to block the image collection device on the wireless earphone and do not need to touch or press the body of the wireless earphone, thereby reducing the operational accuracy of controlling the wireless earphone. At the same time, in this method, the occlusion state in the control image is detected to obtain the detection result of occlusion, and the corresponding wireless earphone control function is performed based on this result, thereby achieving various wireless earphone control functions and providing convenience to the normal use of users.

Based on the above embodiment, in order to improve the efficiency of detection, it may be determined first whether there is occlusion in the control image, and then the grayscale distribution detection is performed when there is occlusion in the control image. Therefore, in a possible scenario summary, after acquiring the control image and before detecting the grayscale value distribution in the control image, the method may further comprise:

S201. calculating a second mean grayscale value of the control image;

It should be noted that, in the embodiments of the present disclosure, the calculation method of the mean grayscale value is not limited, and users can refer to the relevant techniques for calculating the mean grayscale value.

S202. determining whether the second mean grayscale value is less than a first threshold; if so, proceeding to step S203; if not, performing subsequent operations when there is no occlusion in the control image.

It should be noted that, in the embodiments of the present disclosure, subsequent operations when there is no occlusion in the control image are not limited. For example, the subsequent operations may be performing the step of acquiring the control image. When the wireless earphone control operation can be determined by the combination of detection result of occlusion, the subsequent operation may also be generating a detection result of occlusion that represents the absence of occlusion, and adding the detection result of occlusion that represents the absence of occlusion to the combination, so as to perform the step of determining the wireless earphone control operation using the combination.

In the embodiments of the present disclosure, the first threshold is used to distinguish the control image with occlusion from the control image without occlusion. It should be noted that, in the embodiments of the present disclosure, the specific value of the first threshold is not limited, and users can set it according to actual application needs. In the embodiments of the present disclosure, the setting method of the first threshold is also not limited. For example, the first threshold may be fixedly set directly by setting code parameters, or dynamically set by acquiring reference images and utilizing the mean grayscale value of the reference images. Since the method of acquiring reference images and dynamically setting the first threshold by using the mean grayscale value of the reference images can adapt to various lighting environments, in the embodiment of the present disclosure, the reference images may be acquired first, and then the mean grayscale value of the reference images may be set as the first threshold.

It should be noted that, in the embodiments of the present disclosure, the timing of acquiring reference image is not limited. For example, they can be acquired when the earphone is turned on, or when it is detected that the wireless earphone is being worn, or in other situations.

In a possible scenario, the method of setting the first threshold may be:
step 21: when an earphone wearing event is detected, acquiring a first preset quantity of the control images as reference images; and
step 22: calculating a third mean grayscale value of the reference images, and setting the third mean grayscale value to be the first threshold.

It should be noted that, in the embodiments of the present disclosure, the specific value of the first preset quantity is not limited, and users can set it according to actual application needs. In the embodiments of the present disclosure, the specific form of the earphone wearing event is also not limited. For example, it may be an identifier, a short section of program codes, etc.

S203. performing the step of detecting the grayscale value distribution in the control image.

Based on the above Embodiment, in this method, after acquiring the control image, the mean grayscale value in the control image is calculated first, and then compared with the first threshold. When the mean grayscale value is less than the first threshold, it is determined that there is occlusion in the control image, which can effectively distinguish the control image with occlusion from the control image without occlusion, and thus perform grayscale distribution detection targetedly on the control image with occlusion, thereby improving the efficiency of grayscale distribution detection.

Based on the above embodiments, in addition to performing the corresponding wireless earphone control operation by using a single detection result of occlusion, the present disclosure can also use the combination of detection result of occlusion to perform the corresponding wireless earphone control operation. The process of using the combination of detection result of occlusion to perform the corresponding wireless earphone control operation will be described below. The process may comprise:

S301. adding the detection result of occlusion to a detection result list;

Since the combination of detection result of occlusion will be detected, it is necessary to first collect multiple detection results of occlusion and store them in chronological order of generation. In the embodiment of the present disclosure, a detection result list is used to store the detection results of occlusion, which facilitates the subsequent extraction of detection result of occlusion.

It should be noted that, in the embodiments of the present disclosure, the specific form of the detection result list is not limited, as long as the detection result list can store multiple detection results of occlusion in chronological order of generation. In the embodiments of the present disclosure, the quantity of detection results of occlusion that can be accommodated in the detection result list is not limited, and users can choose it according to their actual application needs. Since the detection results of occlusion are continuously stored in the detection result list, there may be a situation where the list is fully filled. In the embodiments of the present disclosure, the subsequent operation after the detection result list is fully filled is not limited. For example, the detection result list may be fully cleared; alternatively, a preset quantity of detection results of occlusion with earlier generation timings may be deleted. In order to improve detection efficiency, in the embodiment of the present disclosure, after the detection result list is fully filled, the detection result list may be directly cleared.

In a possible scenario, before adding the detection result of occlusion to the detection result list, the method may further comprise:

step 31: judging whether a quantity of detection results of occlusion in the detection result list is less than a second preset quantity; if so, proceeding to step 32; if not, proceeding to step 33.

step 32: performing the step of adding the detection result of occlusion to the detection result list; and step 33: clearing the detection result list and performing the step of adding the detection result of occlusion to the detection result list.

It should be noted that, in the embodiments of the present disclosure, the specific value of the second preset quantity is not limited, and users can set it according to actual application needs.

S302. detecting a combination type of detection result of occlusion in the detection result list by using multiple occlusion types in a preset occlusion determination rule;

In the embodiment of the present disclosure, the wireless earphone can be controlled by using a combination type of detection result of occlusion, which may be a combination of detection results of occlusion of different types, or a combination of a different quantity of detection results of occlusion of the same type. For example, when there are two types of detection result of occlusion: occluded and not occluded, the combination type may be that the occluded detection result first appears, and then the non-occluded detection result appears. Of course, it may also be a certain number of detection results of occlusion of the same type.

It should be noted that, in the embodiments of the present disclosure, the specific occlusion types, which are related to the types of detection result of occlusion, are not limited. Users can choose an appropriate occlusion type based on the chosen specific type of detection result of occlusion and actual application needs. For example, when there are two types of detection result of occlusion: occluded and not occluded, the occlusion type may be that the occluded detection result first appears, and then non-occluded detection result appears.

S303. when the combination type meets requirements of the occlusion type, performing a corresponding wireless earphone control operation based on the occlusion type corresponding to the combination type.

It should be noted that, in the embodiments of the present disclosure, it is not limited which occlusion type corresponds to which wireless earphone control operation, and users can set it according to actual application needs.

It should be noted that, in the embodiments of the present disclosure, it is also not limited whether the detection result list needs to be cleared after performing the corresponding wireless earphone control operation. When it can be ensured that there will be not incorrect matches, it is not necessary to clear the detection result list. When it is necessary to avoid incorrect matches, the detection result list may be cleared after performing the corresponding wireless earphone control operation.

Based on the above embodiment, in this method, first, the detection results of occlusion are collected by using the detection result list, and then the combination of detection result of occlusion is detected by using multiple preset occlusion types to determine the corresponding wireless earphone control operation. Finally, the effect of using the combination of detection result of occlusion to perform the wireless earphone control operation is achieved, thereby enriching the control methods of wireless earphones and bringing convenience to the use of users.

The following is an introduction to a wireless earphone control apparatus, an electronic device, a wireless earphone, and a computer-readable storage medium according to the embodiments of the present disclosure, which correspond to the wireless earphone control method as described above and may be referred by each other.

Figure 3:
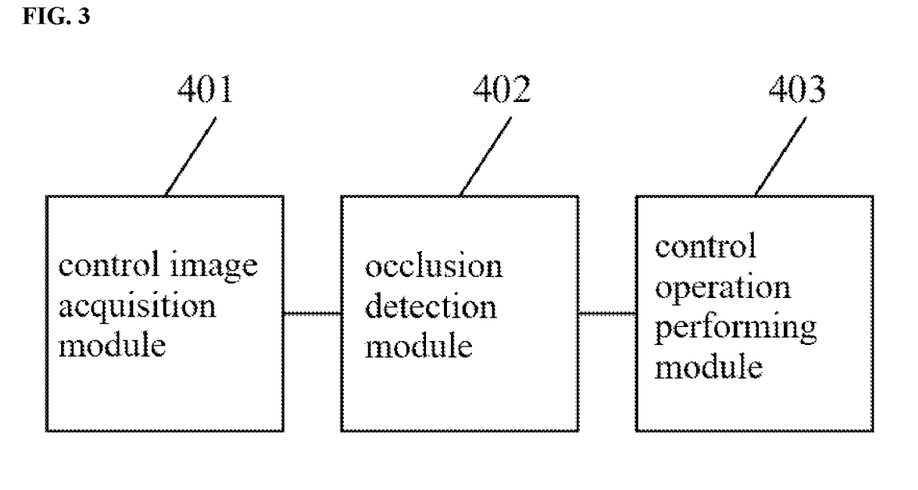
FIG. 3 is a block diagram of the structure of a wireless earphone control apparatus according to an embodiment of the present disclosure.

Please refer to FIG. 3, which is a block diagram of the structure of a wireless earphone control apparatus according to an embodiment of the present disclosure. The apparatus may comprise:

a control image acquisition module 401 for acquiring a control image for controlling the wireless earphone;

an occlusion detection module 402 for detecting grayscale value distribution in the control image to obtain a detection result of occlusion; and a control operation performing module 403 for performing a corresponding wireless earphone control operation based on the detection result of occlusion.

Based on the above embodiment, in this method, the wireless earphone is controlled based on the collection of control images and the occlusion state in the control images. In the prior art, users need to touch or press the body of the wireless earphone, and such a control requires high accuracy, which may cause inconvenience to the normal use of users. However, in this method, users only need to block the image collection device on the wireless earphone and do not need to touch or press the body of the wireless earphone, thereby reducing the operational accuracy of controlling the wireless earphone. At the same time, in this method, the occlusion state in the control image is detected to obtain the detection result of occlusion, and the corresponding wireless earphone control function is performed based on this result, thereby achieving various wireless earphone control functions and providing convenience to the normal use of users.

Optionally, the occlusion detection module 402 may comprise:

a first calculation sub-module for calculating first mean grayscale values of multiple preset sample regions in the control image;

an occlusion position determination sub-module for determining an occlusion position in the control image based on size relationships among the first mean grayscale values; and a detection result of occlusion outputting sub-module for determining the detection result of occlusion based on the occlusion position.

Optionally, the apparatus may further comprise:

a second calculation module for calculating a second mean grayscale value of the control image; and an occlusion judgment module for judging whether the second mean grayscale value is less than a first threshold.

Optionally, the apparatus may further comprise:

a reference image acquisition module for, when an earphone wearing event is detected, acquiring a first preset quantity of the control images as reference images; and a third calculation module for calculating a third mean grayscale value of the reference images, and setting the third mean grayscale value to be the first threshold.

Optionally, the control operation performing module 403 may comprise:

an adding sub-module for adding the detection result of occlusion to a detection result list;

a combination type detection sub-module for detecting a combination type of detection result of occlusion in the detection result list by using multiple occlusion types in a preset occlusion determination rule; and a control operation performing sub-module for, when the combination type meets requirements of the occlusion type, performing a corresponding wireless earphone control operation based on the occlusion type corresponding to the combination type.

Optionally, the apparatus may further comprise:

a quantity judgment module for judging whether a quantity of detection results of occlusion in the detection result list is less than a second preset quantity; and a list clearing sub-module for clearing the detection result list.

An embodiment of the present disclosure also provides an electronic device, which may comprise a memory and a processor. The memory is used to store a computer program, and the processor is used to implement the steps of the wireless earphone control method as described in any of the above embodiments when executing the computer program. For example, when the processor executes the computer program, the following steps are implemented: acquiring a control image; detecting grayscale value distribution in the control image to obtain a detection result of occlusion; and performing a corresponding wireless earphone control operation based on the detection result of occlusion.

Figure 4:
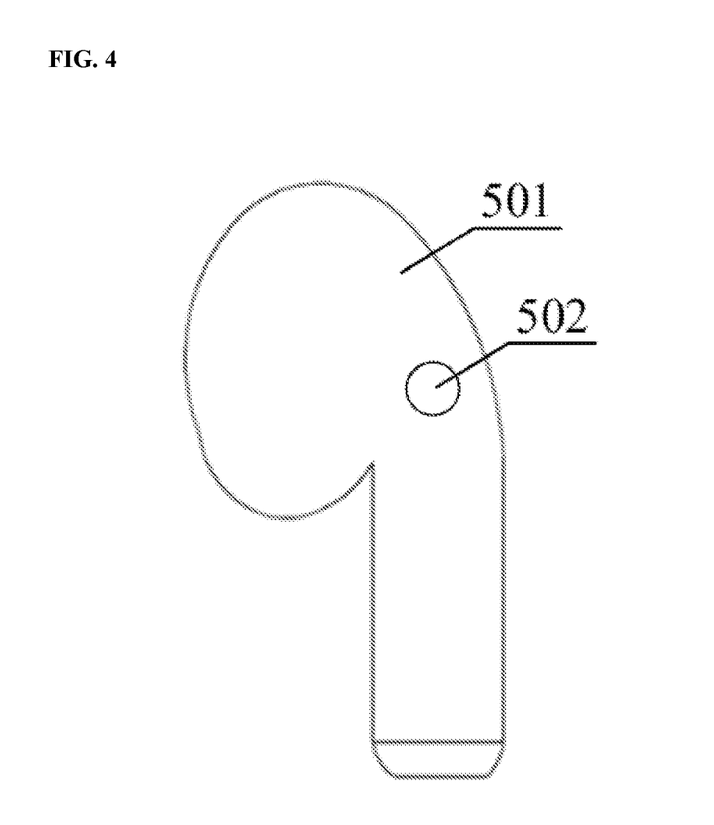
FIG. 4 is a block diagram of the structure of a wireless earphone according to an embodiment of the present disclosure.

An embodiment of the present disclosure also provides a wireless earphone, which may comprise a camera and the electronic device as described above, and the camera is used to collect the control image. Please refer to FIG. 4, which is a schematic diagram of a wireless earphone according to an embodiment of the present disclosure, 501 is the body of the wireless earphone, and 502 is the camera.

Figure 5:
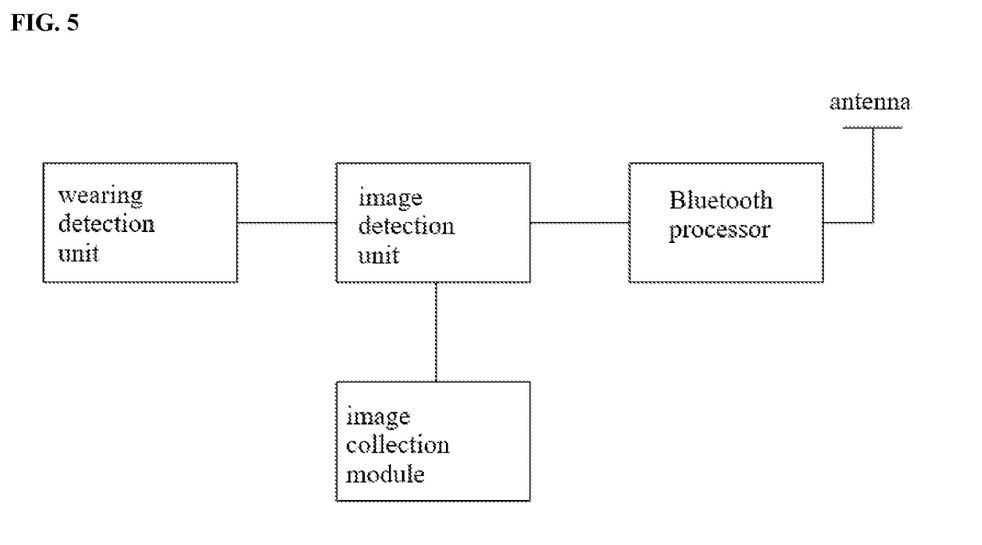
FIG. 5 is a block diagram of the structure of a wireless earphone according to an embodiment of the present disclosure.

It should be noted that the present disclosure does not limit other hardware structures of the wireless earphone. In a possible scenario, please refer to FIG. 5, which is a block diagram of the structure of a wireless earphone according to an embodiment of the present disclosure, the wireless earphone may comprise: a wearing detection unit, an image collection module, an image detection unit, a Bluetooth processor, and an antenna. The wearing detection unit is used to detect whether the user is wearing the wireless earphone. The image collection module is used to timely perform image shooting. The image detection unit is used to perform image detection, generate detection results, and transmit them to the Bluetooth processing module. The Bluetooth processor is used to perform signal processing and wireless connection and transmission. The antenna is used to perform wireless connection and transmission.

The present disclosure also provides a computer-readable storage medium on which a computer program is stored. When the computer program is executed by a processor, the steps of the wireless earphone pairing method described in any of the above embodiments are implemented. For example, when the processor executes the computer program, the following steps are implemented: acquiring a control image; detecting grayscale value distribution in the control image to obtain a detection result of occlusion; and performing a corresponding wireless earphone control operation based on the detection result of occlusion.

The computer-readable storage medium may include various media that can store program codes, such as U disk, mobile hard disk, read only memory (ROM), random access memory (RAM), magnetic disc, optical disc, etc.

The embodiments in this specification are described in a progressive manner. Each embodiment focuses on the differences from other embodiments. The same or similar parts of each embodiment may be referred by each other. As for the devices disclosed in the embodiments, since they correspond to the methods disclosed in the embodiments, their description is relatively simple, and relevant parts may refer to the description of the method part.

Those skilled in the art may further understand that the units and algorithm steps of the examples described in conjunction with the embodiments disclosed herein can be implemented in electronic hardware, computer software or a combination thereof. In order to clearly illustrate the interchangeability of hardware and software, the composition and steps of the examples have been generally described in the above description according to functions. Whether these functions are implemented in hardware or software depends on the specific application and design constraints of the technical solution. Those skilled in the art may use different methods to realize the described functions for each specific application, but such realization shall not be considered beyond the scope of the present disclosure.

The steps of a method or algorithm described in conjunction with the embodiments disclosed herein may be directly implemented by hardware, by software module executed by a processor, or by a combination of hardware and software. The software module may be placed in a random access memory (RAM), an internal memory, read only memory (ROM), an electrically programmable ROM, an electrically erasable programmable ROM, a register, a hard disk, a removable disk, a CD-ROM, or any other form of storage medium known in the art.

The above describes the wireless earphone control method and apparatus, the electronic device, the wireless earphone, and the computer-readable storage medium according to the present disclosure in detail. Herein, specific examples are used to explain the principle and implementation mode of the present disclosure. The description of the above examples is only used to help understand the method and core idea of the present disclosure. It should be noted that, for those skilled in the art, various improvements and modifications can be made to the present disclosure without departing from the principles of the present disclosure, and these improvements and modifications shall fall within the protection scope of the claims of the present disclosure.

The following detailed description is merely exemplary in nature and is not intended to limit the invention or the application and uses of the invention. Furthermore, there is no intention to be bound by any theory presented in the preceding background of the invention or the following detailed description.

What is claimed is:

1. A wireless earphone control method, comprising the steps of:
    acquiring a control image;
    detecting grayscale value distribution in the control image to obtain a detection result of occlusion; and
    performing a corresponding wireless earphone control operation based on the detection result of occlusion,
    the step of detecting grayscale value distribution in the control image to obtain the detection result of occlusion comprises:
    calculating first mean grayscale values of multiple preset sample regions in the control image;
    determining an occlusion position in the control image based on size relationships among the first mean grayscale values; and
    determining the detection result of occlusion based on the occlusion position.

2. The wireless earphone control method according to claim 1, wherein after acquiring the control image and before detecting the grayscale value distribution in the control image, the method further comprises:
    calculating a second mean grayscale value of the control image;
    determining whether the second mean grayscale value is less than a first threshold; and
    if so, performing the step of detecting the grayscale value distribution in the control image.

3. The wireless earphone control method according to claim 2, wherein before acquiring the control image, the method further comprises:
    when an earphone wearing event is detected, acquiring a first preset quantity of the control images as reference images; and
    calculating a third mean grayscale value of the reference images, and setting the third mean grayscale value to be the first threshold.

4. The wireless earphone control method according to claim 3, wherein the step of perform the corresponding wireless earphone control operation based on the detection result of occlusion comprises:
    adding the detection result of occlusion to a detection result list;
    detecting a combination type of detection result of occlusion in the detection result list by using multiple occlusion types in a preset occlusion determination rule; and
    when the combination type meets requirements of the occlusion type, performing a corresponding wireless earphone control operation based on the occlusion type corresponding to the combination type.

5. An electronic device, comprising:
    a memory for storing a computer program; and
    a processor for implementing the wireless earphone control method according to claim 3 when executing the computer program.

6. The wireless earphone control method according to claim 2, wherein the step of perform the corresponding wireless earphone control operation based on the detection result of occlusion comprises:
    adding the detection result of occlusion to a detection result list;
    detecting a combination type of detection result of occlusion in the detection result list by using multiple occlusion types in a preset occlusion determination rule; and
    when the combination type meets requirements of the occlusion type, performing a corresponding wireless earphone control operation based on the occlusion type corresponding to the combination type.

7. An electronic device, comprising:
    a memory for storing a computer program; and
    a processor for implementing the wireless earphone control method according to claim 2 when executing the computer program.

8. The wireless earphone control method according to claim 1, wherein the step of perform the corresponding wireless earphone control operation based on the detection result of occlusion comprises:
    adding the detection result of occlusion to a detection result list;
    detecting a combination type of detection result of occlusion in the detection result list by using multiple occlusion types in a preset occlusion determination rule; and
    when the combination type meets requirements of the occlusion type, performing a corresponding wireless earphone control operation based on the occlusion type corresponding to the combination type.

9. The wireless earphone control method according to claim 8, wherein before adding the detection result of occlusion to the detection result list, the method further comprises:
    judging whether a quantity of detection results of occlusion in the detection result list is less than a second preset quantity;
    if so, performing the step of adding the detection result of occlusion to the detection result list; and if not, clearing the detection result list and performing the step of adding the detection result of occlusion to the detection result list.

10. An electronic device, comprising:
a memory for storing a computer program; and
a processor for implementing the wireless earphone control method according to claim 9 when executing the computer program.

11. An electronic device, comprising:
a memory for storing a computer program; and
a processor for implementing the wireless earphone control method according to claim 8 when executing the computer program.

12. An electronic device, comprising:
a memory for storing a computer program; and
a processor for implementing the wireless earphone control method according to claim 1 when executing the computer program.

13. A wireless earphone, comprising: a camera for collecting a control image, and the electronic device according to claim 12.

14. A wireless earphone control apparatus, comprising:
a control image acquisition module for acquiring a control image for controlling the wireless earphone;
an occlusion detection module for detecting grayscale value distribution in the control image to obtain a detection result of occlusion; and
a control operation performing module for performing a corresponding wireless earphone control operation based on the detection result of occlusion,
the occlusion detection module further comprising:
a first calculation sub-module for calculating first mean grayscale values of multiple preset sample regions in the control image;
an occlusion position determination sub-module for determining an occlusion position in the control image based on size relationships among the first mean grayscale values; and
a detection result of occlusion outputting sub-module for determining the detection result of occlusion based on the occlusion position.

\* \* \* \* \*